United States Patent [19]
Simpson

[11] Patent Number: 5,438,242
[45] Date of Patent: Aug. 1, 1995

[54] APPARATUS FOR CONTROLLING THE BRIGHTNESS OF A MAGNETRON-EXCITED LAMP

[75] Inventor: James E. Simpson, Gaithersburg, Md.

[73] Assignee: Fusion Systems Corporation, Rockville, Md.

[21] Appl. No.: 80,839

[22] Filed: Jun. 24, 1993

[51] Int. Cl.$^6$ ............................................. H05B 37/00
[52] U.S. Cl. .................... 315/219; 315/224; 315/307; 315/308; 315/248
[58] Field of Search ........... 315/308, 248, 219, 209 R, 315/291, 344; 363/17, 95, 132

[56] References Cited

U.S. PATENT DOCUMENTS 5,334,913 8/1994 Ury et al. ............................ 315/344

FOREIGN PATENT DOCUMENTS 0474316 3/1992 European Pat. Off. .

OTHER PUBLICATIONS

"A 1.6-kw, 110-kW DC-DC Converter Optimized for IGBT's", IEEE Transactions, vol. 8, No. 1, Jan. 1993.

Primary Examiner—Robert J. Pascal
Assistant Examiner—Michael B. Shingleton
Attorney, Agent, or Firm—Pollock, Vande Sande & Priddy

[57] ABSTRACT

A power supply for providing a stable operating current to a magnetron-excited lamp. The power supply includes a DC to DC inverter for driving a primary winding of a high voltage transformer. The DC to DC inverter has a circuit including two pairs of switching elements for connecting a DC voltage supply to the primary winding. During each half of the switching cycle, one of the switching elements is pulse width modulated while the other remains on for a substantially fixed period of time. During the second half of the cycle, the remaining pair operates so that one switching device is on for a pulse width modulated period of time, and the other is on a substantially constant amount of time. The on time for the pulse width modulated switching elements is defined by an input voltage setting representing a desired brightness level for the lamp, the output magnetron current, and a representative of the integral of the current flowing through the primary of the inverter transformer.

4 Claims, 7 Drawing Sheets

APPARATUS FOR CONTROLLING THE BRIGHTNESS OF A MAGNETRON-EXCITED LAMP

The present invention relates to microwave-powered discharge lamps. Specifically, a power supply is described which will precisely control the brightness of a microwave-powered discharge lamp at different brightness levels.

In the integrated circuit fabrication art, it is known to perform stabilization of photoresist by adjusting the level of exposure of photoresist-coated substrates to ultraviolet light. Ultraviolet lights, which are excited from a magnetron source of power, permit a precise level of brightness to be set accurately controlling the exposure of photoresist-coated wafers.

The prior art power supplies for exciting the magnetrons are of the ferro-resonant type, which permit step changes in output voltage, thereby providing step changes in the brightness of an excited lamp. Different schemes have been used to control the magnetron output power. These include selecting different transformer taps on the power supply, switching different capacitors in and out of the power supply circuit, and varying the magnetic field of the magnetron. Further, the input voltage to the power supply may be adjusted with autotransformers as well as by adding resistance to the circuit.

Various types of phase control circuits may also be employed to supply pulses of a short duration to the lamp at the power line frequency. At low power levels, this may cause flickering and extinction of the excited lamp, requiring a delay before the wafer processing may continue.

The processing of photoresist-coated wafers requires the adjustment of the ultraviolet lamp brightness to a low operating level for a set period of time, following which the brightness is increased to a maximum level. Each brightness level must be controlled to obtain the correct exposure of the wafers.

SUMMARY OF THE INVENTION

It is an object of this invention to provide a magnetron power supply having a selectable output current level.

It is another object of this invention to provide an apparatus for setting the brightness level of a magnetron-excited ultraviolet lamp.

It is an object of this invention to improve the efficiency of magnetron power supplies.

It is a further object of this invention to provide for overvoltage protection for shutting down a magnetron power supply.

These and other objects of the invention are provided by an power supply circuit which provides a stable operating current for a magnetron-excited lamp. The power supply includes a DC-DC inverter connected to a high voltage transformer. The secondary of the high voltage transformer provides a rectified DC voltage for powering the magnetron.

The inverter has a drive circuit which includes two pairs of switching elements connected to a DC voltage supply. The switching elements alternately supply current to the primary of the transformer in first and second opposite directions. One pair of switching elements is on during each half of the inverter cycle to drive current through the primary winding in the first or second directions. One of the switching elements of a pair has an on time which is of a fixed duration, while the other is operated to have a variable on time which controls the current level supplied to the magnetron.

A switching controller is provided to generate pulse width modulated drive pulses. The switching controller receives an input voltage which is proportional to the desired level of magnetron current. The switching controller generates drive pulses having a duration which is a function of the magnetron current, the desired level of magnetron current and a feedback current representing the primary winding current. The feedback current is integrated before it is received by the switching controller. When the integrated current level reaches a particular value, the pulse is cut off and the trailing edge of the pulse width modulated pulse is defined.

This system provides for accurate current level control so that the excited ultraviolet lamp can be operated at very low illumination levels.

DESCRIPTION OF THE PREFERRED EMBODIMENT

Figure 1:
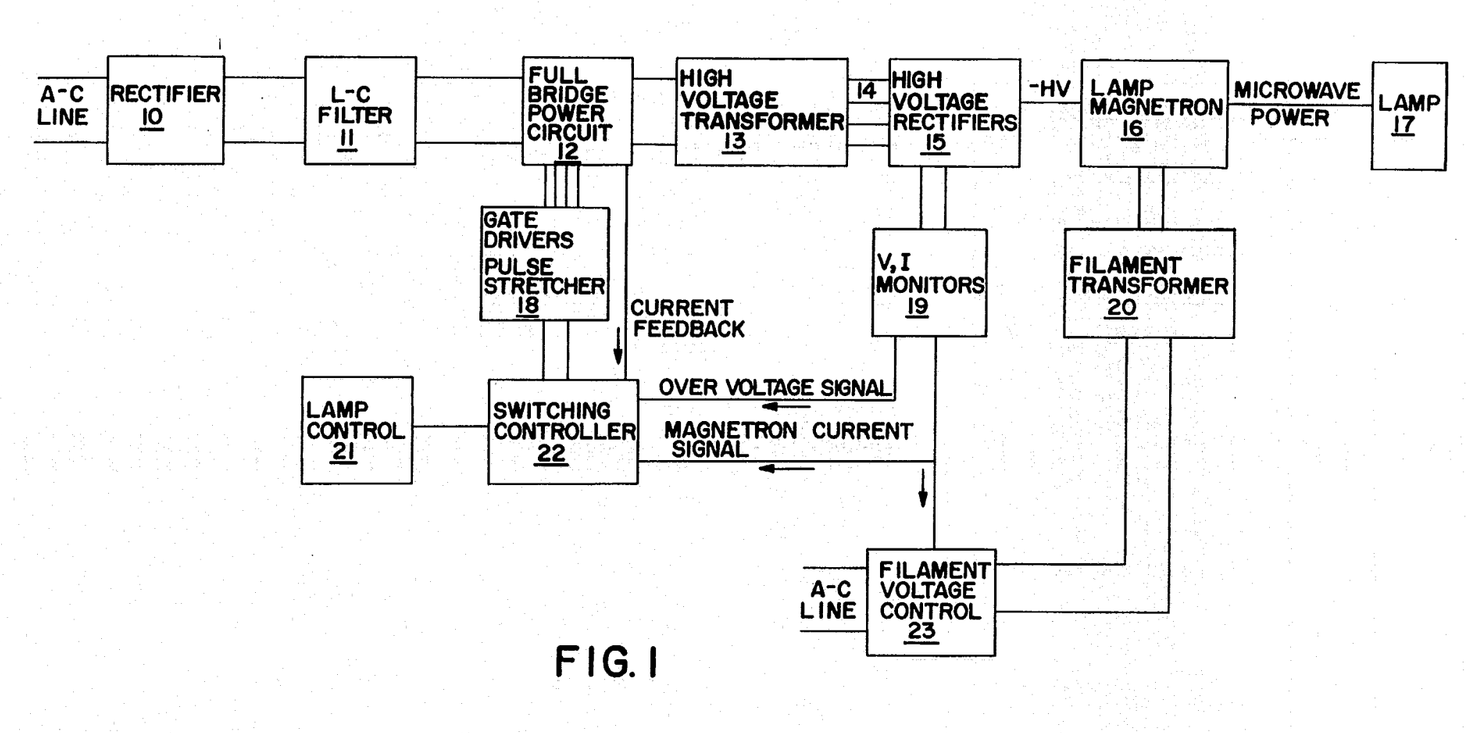
FIG. 1 is a block diagram of a power supply in accordance with a preferred embodiment.

Referring now to FIG. 1, there is shown a block diagram of the power supply for powering a magnetron 16 which excites an ultraviolet lamp 17. The device shown is an inverter circuit, receiving a low DC voltage from rectifier 10 and LC filter 11, and converting the voltage to an alternating current for exciting the high voltage transformer 13. The inverter circuit uses a full bridge power circuit 12. The full bridge power circuit includes two pairs of switching transistors for alternately supplying current in first and second directions to the primary of high voltage transformer 13.

The high voltage transformer 13 produces from multiple windings 14, an alternating voltage which is converted by the rectifier filter circuit 15 into the required high voltage for driving the magnetron 16. The full bridge power circuit 12 is switched by four signals from the gate drivers and pulse stretcher circuit 18. During each half cycle of operation, a pair of switching devices is rendered conducting in the full bridge power circuit 12. One of the switching devices of each pair is maintained conducting for a fixed period of time, while the other is pulse width modulated.

A switching controller 22, which is a standard component, provides pulse width modulated signals to the gate drivers and pulse stretcher 18. The pulse width is derived from a setting established by the user through a lamp control 21, as well as from a determination of the current level flowing in the primary of the high voltage transformer 13, and a determination of the magnetron current level. The use of the two control signals, the current feedback from the primary winding and the magnetron current signal detection, permits rapid and precise control over the magnetron excitation current produced from high voltage rectifier 15 for all settings of the lamp intensity.

A filament voltage controller 23 is shown which is used to reduce the filament voltage as the magnetron operation current increases in accordance with the manufacturer's specifications.

Figure 2:
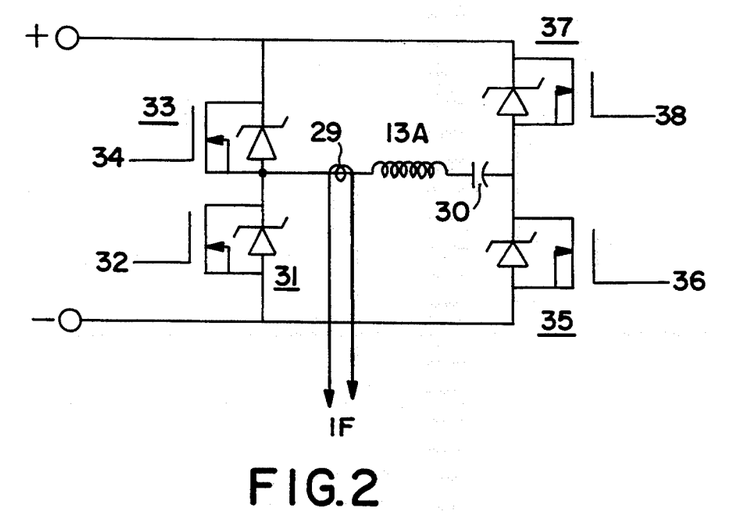
FIG. 2 illustrates in detail the construction of the preferred embodiment of the switching circuit.
Figures 3A, 3B:
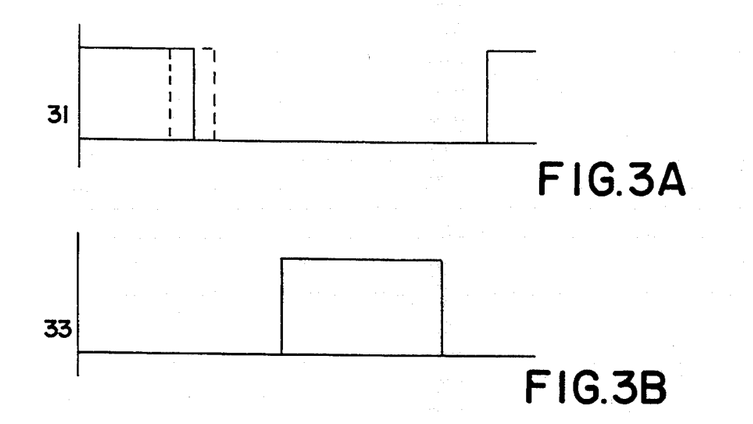
FIG. 3 illustrates the various signal waveforms produced by the components of FIG. 1.
Figure 3C:
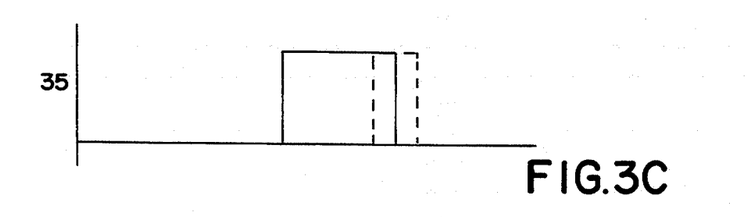
Figure 3D:
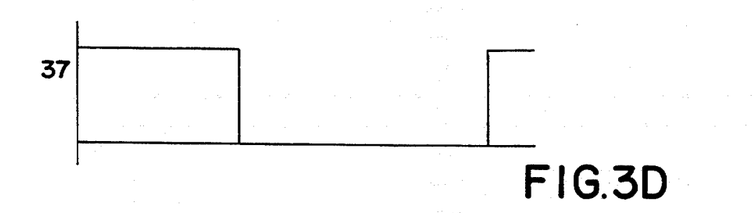
Figure 3E:
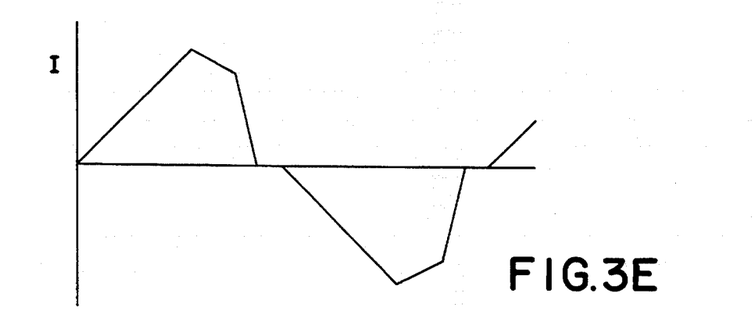
Figure 3F:
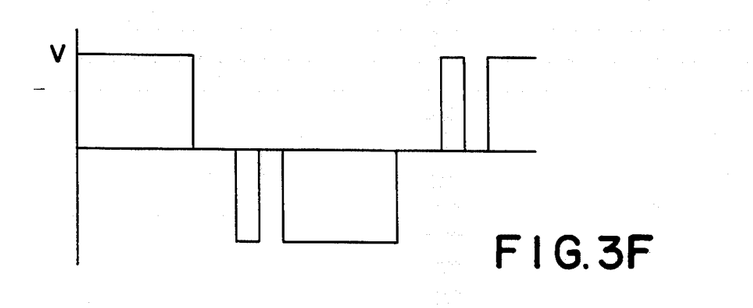

The full bridge power circuit is shown more particularly in FIG. 2. The bridge of FIG. 2 includes four (4) switching devices 31, 33, 35 and 37. The primary 13a of the high voltage transformer 13 is shown as connected in series with a feedback winding 29, for providing a replica of the primary current. The voltage from the LC filter 11 is applied to the transformer primary winding 13a to produce a current during one half of the switching cycle in a first direction, and during a second half of a switching cycle in a second direction. The first pair of switching devices 33 and 35 operate such that current flows in the first direction through winding 13a. During a second portion of the cycle, current flows by switching devices 31 and 37 to provide current in the opposite direction.

The switching of the full bridge power circuit switching devices is illustrated more completely in FIG. 3. FIG. 3 traces A, B, C and D illustrate the voltage applied to the gates of switching devices 31, 33, 35 and 37, respectively.

During one half of the switching cycle, the pulse width modulated gate signal is applied to the gate of switching device 31 and during the other half of the switching cycle is applied to the gate of switching device 35. A constant pulse width signal is applied to the gates of switching devices 33 and 37, respectively, permitting the current to flow in alternate directions of the primary winding 13a during each half of the switching cycle.

Figure 4A:
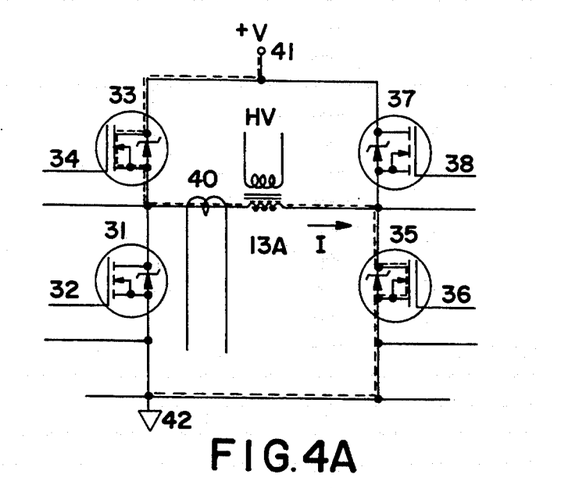
FIG. 4A illustrates the operation of the switching circuit when one pair of switches are conducting.
Figure 4B:
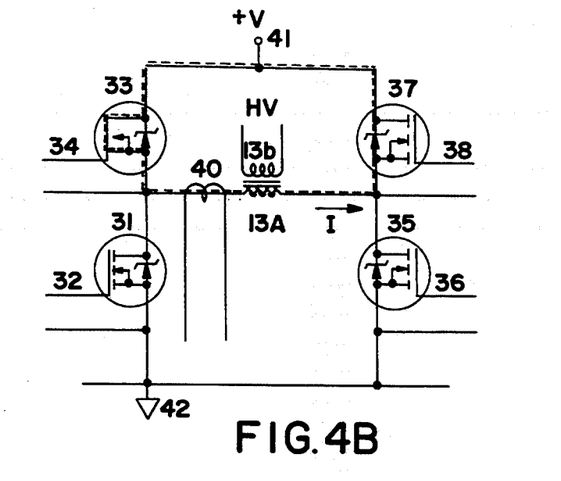
FIG. 4B illustrates the operation of the switching circuit during the first portion of the switching cycle when only one of the switches of a pair of switches is conducting.
Figure 4C:
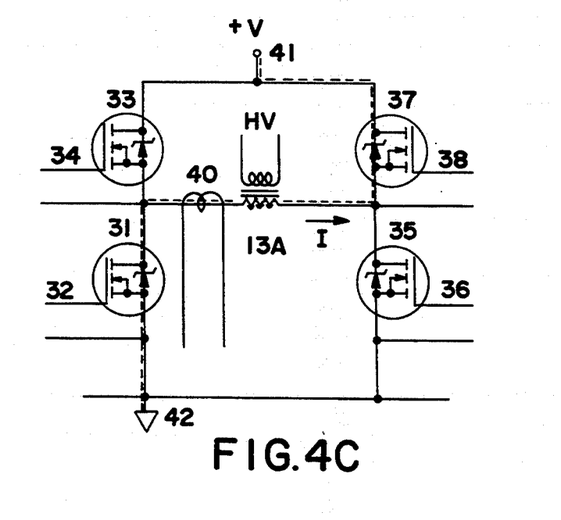
FIG. 4C illustrates the first portion of the switching cycle when the diodes of switching elements 31 and 37 are both conducting.

One half of the switching cycle is illustrated in FIGS. 4A, 4B and 4C. In FIG. 4A, current is supplied through the transformer primary winding 13a in the direction shown. The representation of current flow in FIG. 4A is the time in which the pulse width modulated switching device 33 and switching device 35 are simultaneously conducting current.

As is illustrated in FIG. 4A, during a first portion of the switching cycle, current flows through switching device 33 and 35. As FIG. 3 illustrates, devices 33 and 35 are on together for a portion of the time which produces the current flow of FIG. 4A. When the pulse width modulated control signal turns off switching device 35, as is shown in FIG. 3, switching device 33 remains on as the control pulse applied to the device is on for a fixed period of time, represented in FIG. 3. During this interval in which device 33 is on, and device 35 is turned off, the current flow is as shown in FIG. 4B. The diode associated with switching device 37 permits the current flow to continue through the primary winding 13a in the same direction, generating further current for the secondary 13b of the high voltage transformer 13.

The asymmetric switching permits the collapsing field of the transformer 13 to continue generating current in the secondary winding of transformer 13 rather than returning such energy to the source of DC voltage provided by LC filter 11 and rectifier 10 of FIG. 1, as occurs in prior art power switching circuits.

When both switching devices 33 and 35 are off prior to beginning the second half of the switching cycle, any remaining current flows in the same direction in the primary 13a, through the diodes of the devices 31 and 37, as shown in FIG. 4C.

As will be seen from FIG. 3, there is a dead time provided between switching each pair of switching devices to avoid inadvertently shorting out the supply voltage. Following the dead time, the second half of the switching cycle commences.

Figure 5:
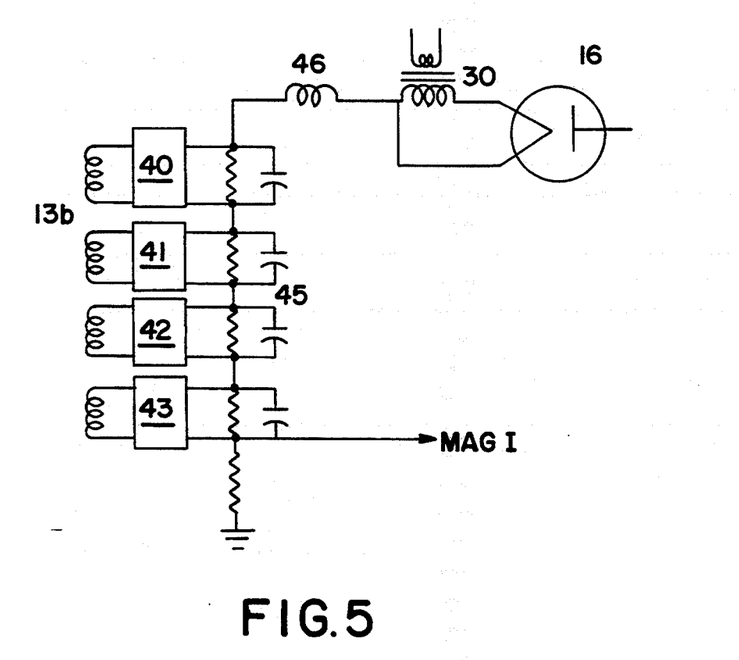
FIG. 5 illustrates the secondary circuit of a high voltage transformer and the connected magnetron filament.

The current introduced into the secondary 13b of transformer 13 is supplied to a plurality of windings as is shown in FIG. 5. Referring to FIG. 5, the secondary 13 includes a plurality of windings connected to rectifier circuits 40-43. The output voltage from the rectifier circuits is summed in summing network 45. The output from each rectifier circuit is connected to a resistor and parallel connected capacitor. The resistors are serially connected together to form summing network 45. The resulting current is supplied to the magnetron 16 through a choke input 46.

The summing network 45 includes a tap which provides a voltage indicative of the current supplied to the magnetron. As will be clear from the discussion which follows, this magnetron current sample is used to control the switching controller 22.

Returning to FIG. 3, trace E represents the current produced in the primary 13a of transformer 13. The current shows a linear increase during the time in which two switching devices of a switching element pair are conducting. The linear decrease from the peak current level represents the time when only the one transistor of a pair is conducting, i.e., the circumstance of FIG. 4B. When both switching devices are off, the current rapidly decreases to zero.

Prior to the start of the next half of the cycle, wherein the second pair of controlled switching devices are operated, a dead time exists. The dead time insures that at no time are different pairs of switching elements of the full bridge power circuit of FIG. 2 simultaneously on, producing a short circuit condition across the supply voltage.

Trace F of FIG. 3 illustrates the voltage across the primary winding 13a during various switching times. As can be seen, a large transient voltage is produced at the time the current falls to zero when no switching elements are on.

The foregoing structure permits more current to be delivered to the secondary and load than if the switching devices were operated such that each pair of controlled switching devices were turned on and off at the same time. Such an operation is known to produce a primary current which is sent back to the source of the voltage, rather than being transferred to the secondary as useful output power.

The foregoing technique provides for obvious advantages in overall power efficiency.

Control over switching of the bridge power circuit 12 in accordance with the switching signals illustrated in FIG. 3 is achieved by use of the switching controller 22, and a gate driver and pulse stretcher circuit 18. The output of switching controller 22 of FIG. 1 comprises two pulse width modulated pulses identifying the beginning of the first and second halves of the switching cycle for the bridge power circuit represented by traces A and C of FIG. 3. The pulse stretcher produces the constant width pulses of traces B and D of FIG. 3 from the leading edge of the pulse width modulated pulses.

Figure 6:
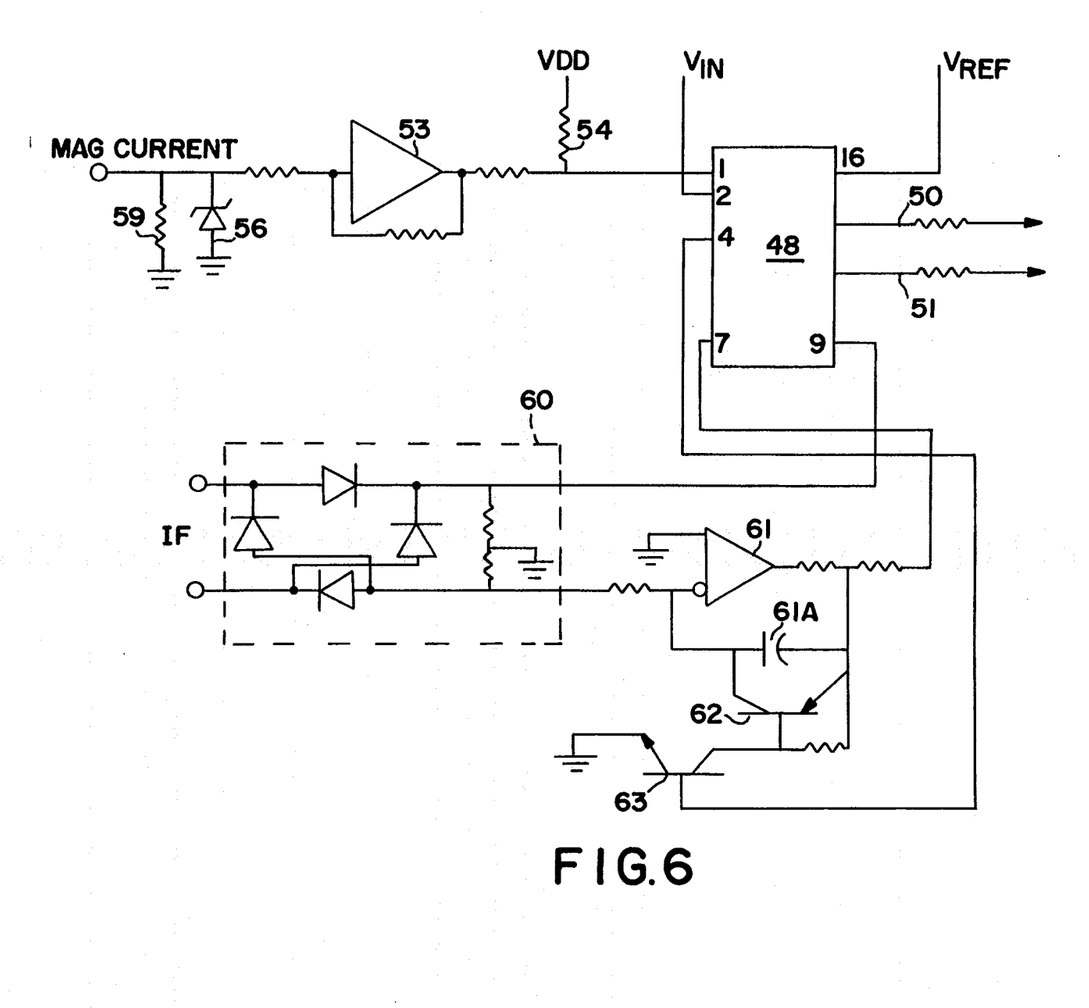
FIG. 6 illustrates the primary winding feedback current integrator for deriving a control signal for the pulse width modulator.

Details of the switching controller 22 are shown in FIG. 6. A switching controller comprises a standard integrated circuit such as the Unitrode UC 3825 controller. Pin 2 of controller 48 is connected to the lamp 21 control of FIG. 1. The voltage supplied to pin 2 represents a selected brightness level for the lamp 17. Timing circuitry for establishing an internal clock signal have been omitted from FIG. 6 for clarity, Details of such timing circuitry may be seen from the applications not in Unitrode's Linear Integrated Circuit Handbook.

The voltage level from the combiner 45, representing the average current through the magnetron, is applied to resistor 59 and Zener diode 56. The Zener diode 56 will prevent any damage to operational amplifier 53 in the event of an excessive current or voltage condition which is momentarily experienced in the magnetron circuit.

Resistor 54 provides an appropriate bias level to the signal produced by amplifier 53. The signal from amplifier 53 represents the output current of the magnetron for the given setting represented by VIN on pin 2 of controller 48. As will be evident from the manufacturers' published application notes for this controller, controller 48 provides a pulse width modulated output on 50 and 51, having a pulse width which is proportional to the difference between VIN and the level represented by the voltage from operational amplifier 53. Thus, as the magnetron current falls below the level represented by the setting of lamp control 21, applied to pin 2 of the controller 48, the output pulses 50 and 51 will have a greater duration.

The current representing the primary winding 13a current is rectified in bridge rectifier 60. The voltage is applied across a resistor pair 60 a which has a common connection grounded. One end of the resistor pair 64 supplies a current integrated by an integrator circuit 61 having a capacitor 61 a. Integrator circuit 61 integrates a replica of the current signal shown in trace E of FIG. 3 to create a parabolically increasing current, and is used to define the position of the trailing edge of each of the pulse width modulated signals 50 and 51. Thus, the controller circuit 48 will initiate a pulse width modulated signal in synchronism with an internal clock signal, when VIN exceeds the replica of the magnetron current produced by amplifier 53. The pulse will be terminated when the integrator 61 ramps up to a level proportional to $$\overline{VIN - V53out}$$

The current pulses produced in the primary of the transformer 13 are individually integrated to produce pulses of constant charge, rather than peak current sensing, which is commonly used as a control over the pulse width. The circuit runs stably, either with or without a capacitor 30 in series with the transformer primary 13a, as shown in FIG. 2.

The integrator capacitor 61 a is quenched at the end of each cycle by clock pulses from the controller 48. Thus, the integrator is recharged each half cycle of the bridge power circuit.

The other end of the resistor pair 60 a is connected to pin 9 of the controller 48. In the event of an excessive primary current in winding 13a, the voltage appearing on pin 9 will stop controller 48 from supplying output pulses 50, 51.

Figure 7:
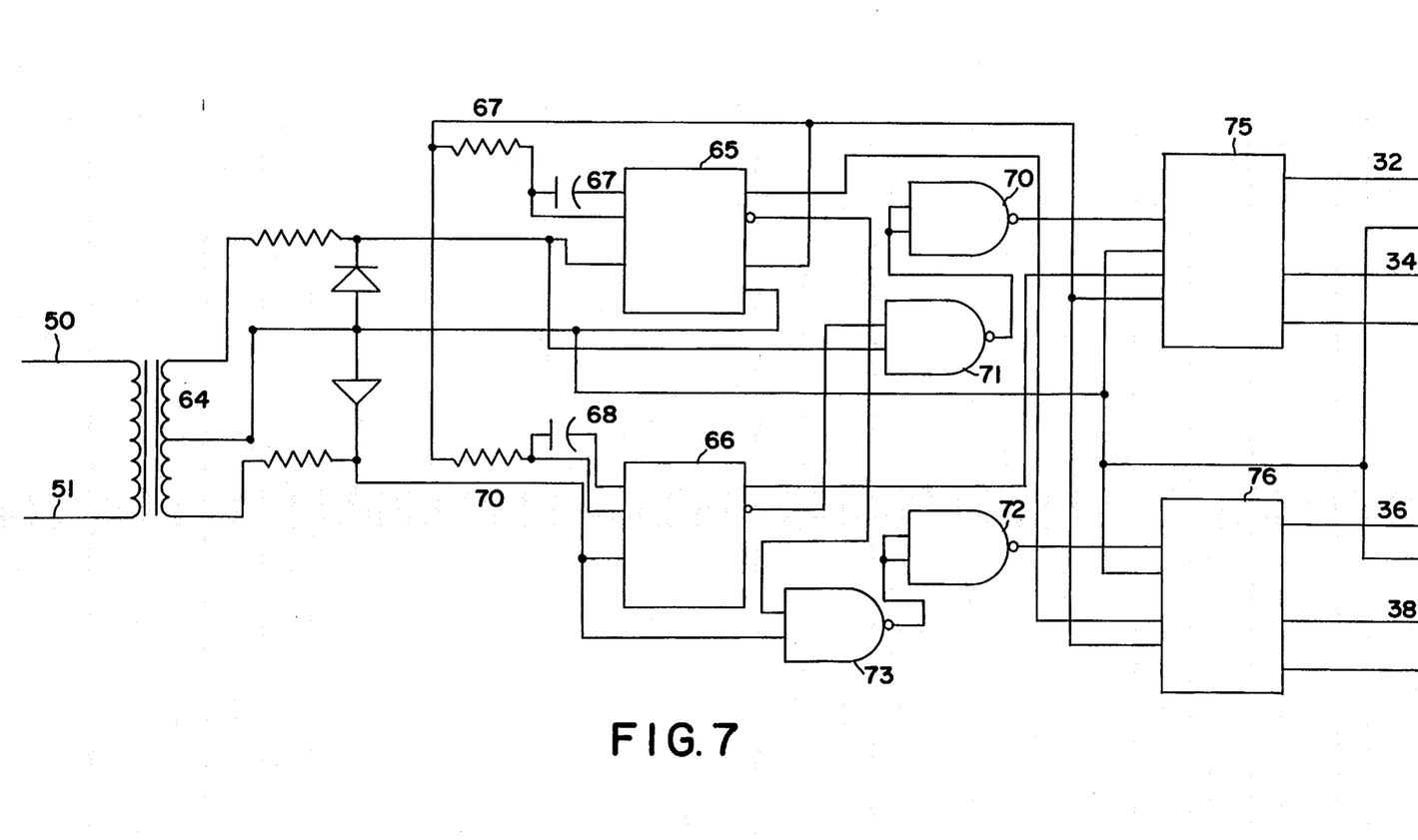
FIG. 7 is a schematic drawing of the pulse stretcher used to provide switching signals to the switching circuit.

The circuit for stretching the pulses to provide not only the required pulse width modulated pulse for operating one control switch of the bridge, as well as a fixed duration pulse for operating the other switch of the control bridge each half cycle, is shown in FIG. 7. A transformer 64 receives each of the pulse output signals 50, 51 from the controller 22. Monostable multivibrators 65 and 66 are triggered by the leading edge of the pulse width modulated signals. The monostable multivibrators 65 and 66 have a operational time established by resistor 69 and capacitor 67 and capacitor 68 and resistor 70, representing the pulse widths of traces B and D of FIG. 3. The pulse widths established are less than ½ the total switching time. In this way, the possibility of overlap between each pair of the control switches is avoided, which would produce a short circuit condition across the power bridge of FIG. 2.

Gates 70, 71, 72 and 73 further provide protection against simultaneous activation of control switches in different pairs of control switches.

Driver circuits 75 and 76 provide the current amplification needed to drive the various control gates 32, 34, 36 and 38 of the full bridge power circuit 12 of FIG. 2.

Figure 8:
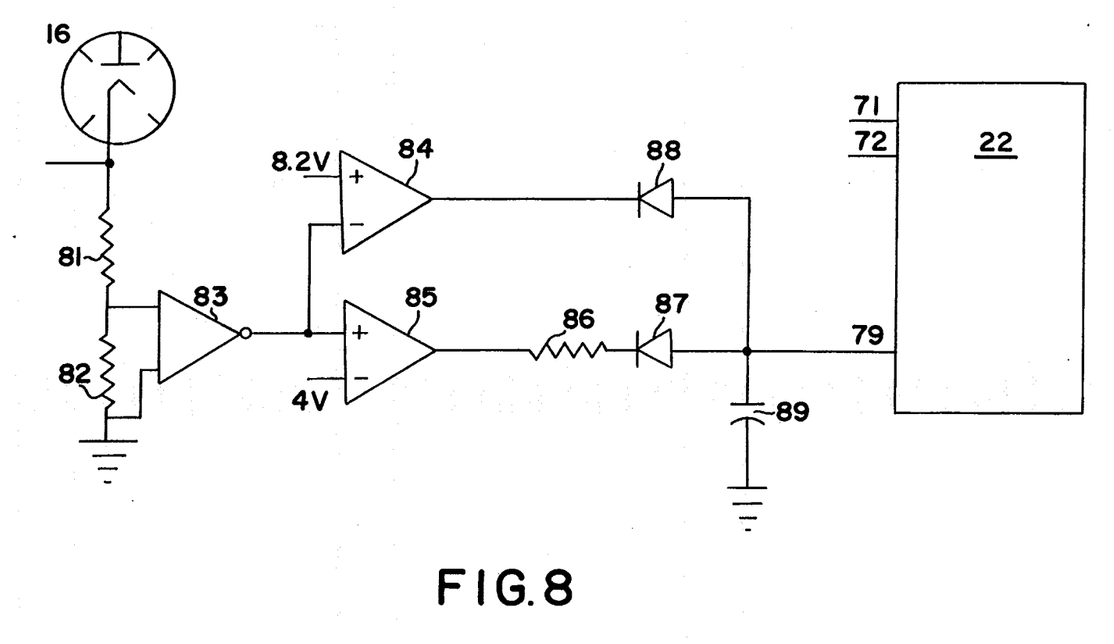
FIG. 8 is an over voltage protection device for shutting down the high voltage when the voltage of the magnetron is above a threshold value.

Referring now to FIG. 8, there is shown an implementation for providing for over voltage control of the magnetron 16 voltage. As is shown in FIG. 8, dividing resistances 81 and 82 are connected in series and to the magnetron 16. Comparators 84 and 85 compare the voltage from amplifier 83 representing the level of magnetron cathode voltage with a voltage representing the maximum safe limit for the magnetron. The outputs of the comparator are connected through resistor 86 and diode 87, and diode 88 to an integrating capacitor 89. This voltage is connected to the soft start terminal of controller 48. When the high voltage applied to the magnetron cathode is low, for example less than 2 kv on a 3.5 kv magnetron, comparator 85 is low. This could be caused by a short circuit or internal arcing. Resistor 86 partially discharges capacitor 87, or during initial start-up limits the rise of voltage so that the soft-start feature of 48 restricts pulse width and reduces the maximum power supply current. High voltage can be excessive. For example, over 4 kv on a 3.5 kv magnetron. If the magnetron modes, or has a cold filament, in this case, comparator 84 discharges 89 momentarily. Power supply operation is interrupted and restarts with a soft start, increasing pulse width. The cycle time is short so that the microwave power lamp remains ionized.

Thus, there is shown how magnetron current can be safely controlled and regulated so that for any level of brightness set by the lamp control 21, it is possible to achieve a highly-regulated magnetron current, avoiding extinction of the lamp and moding problems which may occur in magnetron operation. Those skilled in the art will recognize yet other embodiments described by the claims which follow.

What is claimed is:

1. A switched inverter circuit for providing an alternating current to the primary winding of a high voltage transformer for setting an operating current in a secondary winding of said transformer comprising:
   a source of DC voltage;
   a first pair of switching devices connecting first and second ends of said primary winding to first and second terminals of said source of DC voltage, and a second pair of switching devices connecting said second and first terminals to said first and second ends of said primary windings; and,
   means for alternately enabling said pairs of switching devices, one of said devices being enabled for a fixed period of time, and the other of said devices being enabled for a variable length of time comprising:
   a first feedback means connected to sense said operating current;
   comparator means for comparing said sensed operating current with a selected operating reference current to derive said variable length of time;
   pulse generator means connected to said comparator means deriving first and second alternate pulses having a duration equal to said variable length of time;
   second feedback means for sensing a current in said primary winding, said second feedback means providing a signal to said comparator for shortening said variable length of time, thereby controlling the duration of said alternate pulses.

2. The switched inverter circuit of claim 1 wherein said second feedback means includes an integrator for integrating a sensed current representing said primary winding current.

3. The switched inverter circuit of claim 1 wherein said means for alternately enabling said pairs of switching devices includes:
   first and second multivibrators for generating during alternate periods of time first and second pulses having a substantially constant duration in response to first and second pulses from said pulse generator means representing said variable length of time; and,
   driver circuit means connected to receive said first and second multivibrator output signals, and said pulse generator means first and second signals, said driver means being connected to control gates of said first and second pairs of said switching devices.

4. The switched inverter circuit of claim 1 further comprising over voltage sensing means connected to sense an excessive operating current; and,
   means for disabling said pulse generator means in response to said over voltage sensing means.

* * * * *